H. C. KESTEL.
LABELING MACHINE.
APPLICATION FILED AUG. 12, 1914.

1,160,415.

Patented Nov. 16, 1915.
7 SHEETS—SHEET 4.

WITNESSES:-

INVENTOR.

H. C. KESTEL.
LABELING MACHINE.
APPLICATION FILED AUG. 12, 1914.

1,160,415.

Patented Nov. 16, 1915.
7 SHEETS—SHEET 5.

WITNESSES:-

INVENTOR.

H. C. KESTEL.
LABELING MACHINE.
APPLICATION FILED AUG. 12, 1914.

1,160,415.

Patented Nov. 16, 1915.
7 SHEETS—SHEET 7.

WITNESSES:-

INVENTOR.
Henry C. Kestel.
by
Owen, Owen & Crampton

UNITED STATES PATENT OFFICE.

HENRY C. KESTEL, OF TOLEDO, OHIO.

LABELING-MACHINE.

1,160,415.　　　　Specification of Letters Patent.　　Patented Nov. 16, 1915.

Application filed August 12, 1914.　Serial No. 856,508.

*To all whom it may concern:*

Be it known that I, HENRY C. KESTEL, a citizen of the United States, and a resident of Toledo, in the county of Lucas and State of Ohio, have invented a certain new and useful Labeling-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to machines for applying labels to bottles.

It has for its object to cover labels with an agglutinating agent and then applying and affixing the labels to the bottles.

In the construction embodying my invention, the bottles are fed to the machine in succession and the labels are manipulated as the bottles come within the field of operation of the labeling part of the machine and applied to the bottles. The bottles are then removed from the machine as fast as the labels are applied.

The machine is automatic in character and is provided with a number of automatic controlling features.

The invention may be contained in many forms of constructions usable for different purposes, all of which come within the purview of my claims hereinafter appended. To show the practicability of my invention, I have selected one of such constructions as an example and shall describe it hereinafter. The construction selected is illustrated in the accompanying drawings.

Referring to the drawings.

Describing the performance of the machine in a general way, the bottles 1 are fed onto a revolving plate 2 and the labels are placed in packs 3 in the racks or containers 4. The labels are conveyed to the bottles by the conveyers 5, having glue pads 6 and 7, which are covered with paste by being drawn over the font 8. They are subsequently pressed against the under or blank sides of the lowermost labels after the conveyers have been turned over. The conveyers are again returned carrying with them the labels which are applied to the necks and bodies of the bottles as the bottles pass through the conveyers. The bottles are then ejected while the pads on the label conveyers receive another application of the paste and are pressed against the succeeding pair of labels in the packs 3 of the labels.

Describing the mechanism and its operation in detail, the bottles 1, are fed to the bottle-carrying table or plate 2 in a suitable trough 10. As the bottles pass onto the bottle-carrying plate 2, they pass in front of pins 11 located on the bottle-carrying plate 2, which forces the bottles 1 against the wheel 12 which operates to prevent more than one bottle passing at a time onto the plate, and brings the bottles 1 in position against the push pins 11. The wheel 12 is supported on a pivoted arm 13, which is in turn supported on the bracket 14. The arm 13 is yieldingly held against the bottles as they pass the wheel 12, by the spring 15.

As bottle 1 is carried around the bottle-carrying plate 2, it passes between the racks 20 and 21 which shift radially the bottles as they are carried by the plate 2 and pushed by the pins 11. The racks 20 and 21 have inclined portions 23 which return the bottles radially to their positions on the plate 2 in front of the pins 11. The racks 20 and 21 are secured to a frame 24 which forms a part of the supporting pedestal 25. The plate 26 forms a part of the frame 24. The rack 20 is secured to the plate 26 by means of the vertical strips 27. The rack 21 is supported by means of strips 28 which extend around the fixed shaft or spindle 29.

As bottles 1 are pushed outward by the operation of the racks 20 and 21, the bottles are forced against the arm 30 which is keyed to a shaft 31 supported in bearings 32 connected to the frame 24. This operates the escapement lever 33 supported on the trough 10 by means of the bracket 34. It is connected by means of the link 35 to one end of the arm 36. The lever 30 also operates the arm 40 which is connected through the connecting rod 41 with the bell crank lever 42. This operates the labeling mechanism so as to permit the delivery of labels when bottles pass the lever 30 as described hereinafter.

Figure 1:
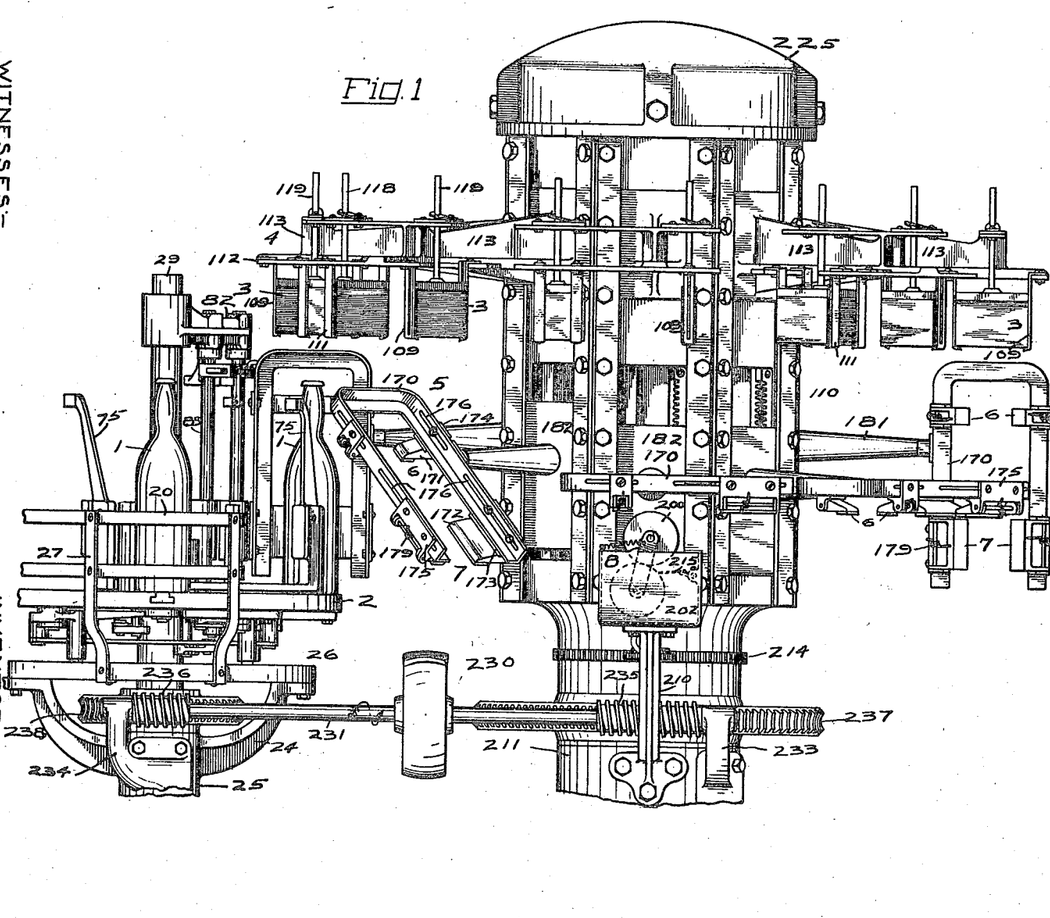
Figure 1, is a side view of the labeling machine.
Figure 2:
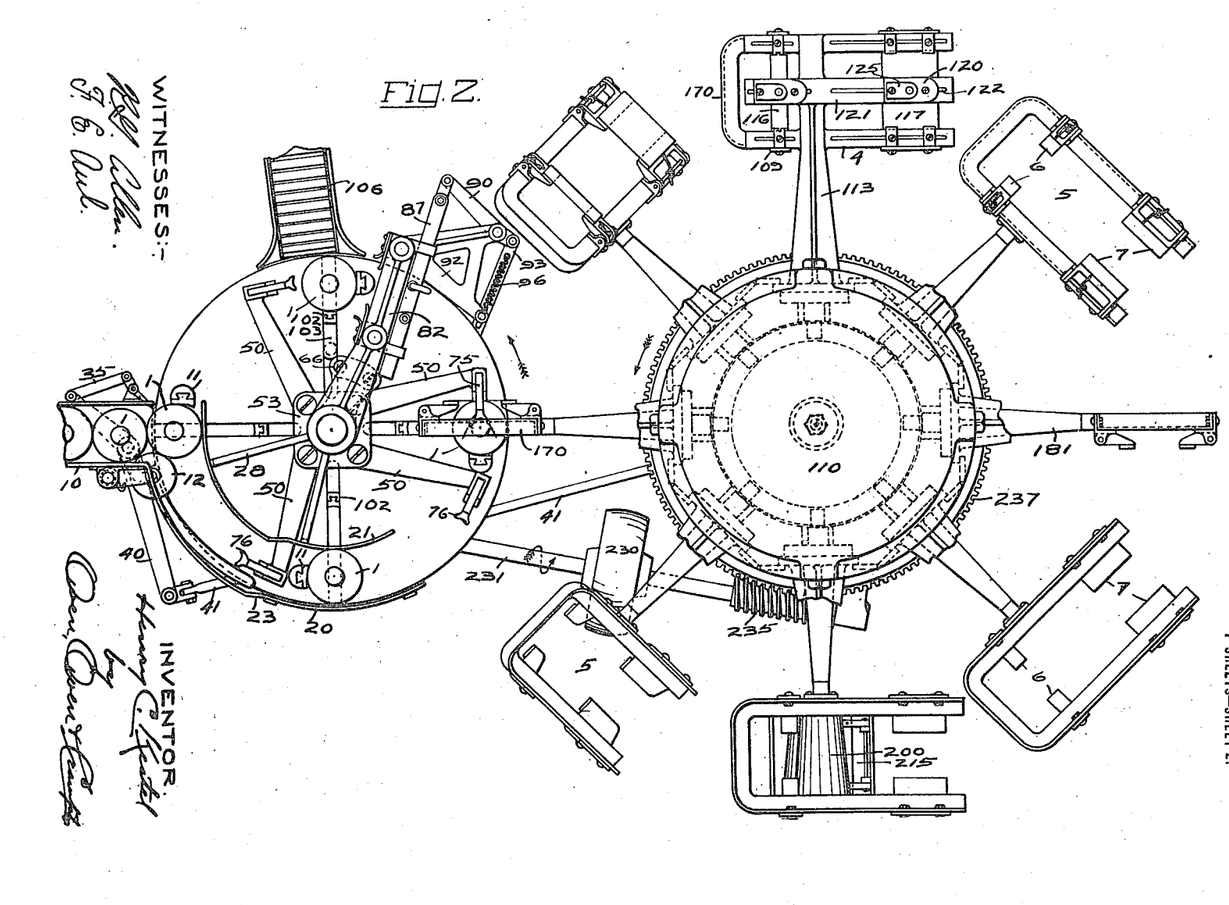
Fig. 2, is a plan view illustrating the operation of the machine.
Figures 3, 4, 5, 6:
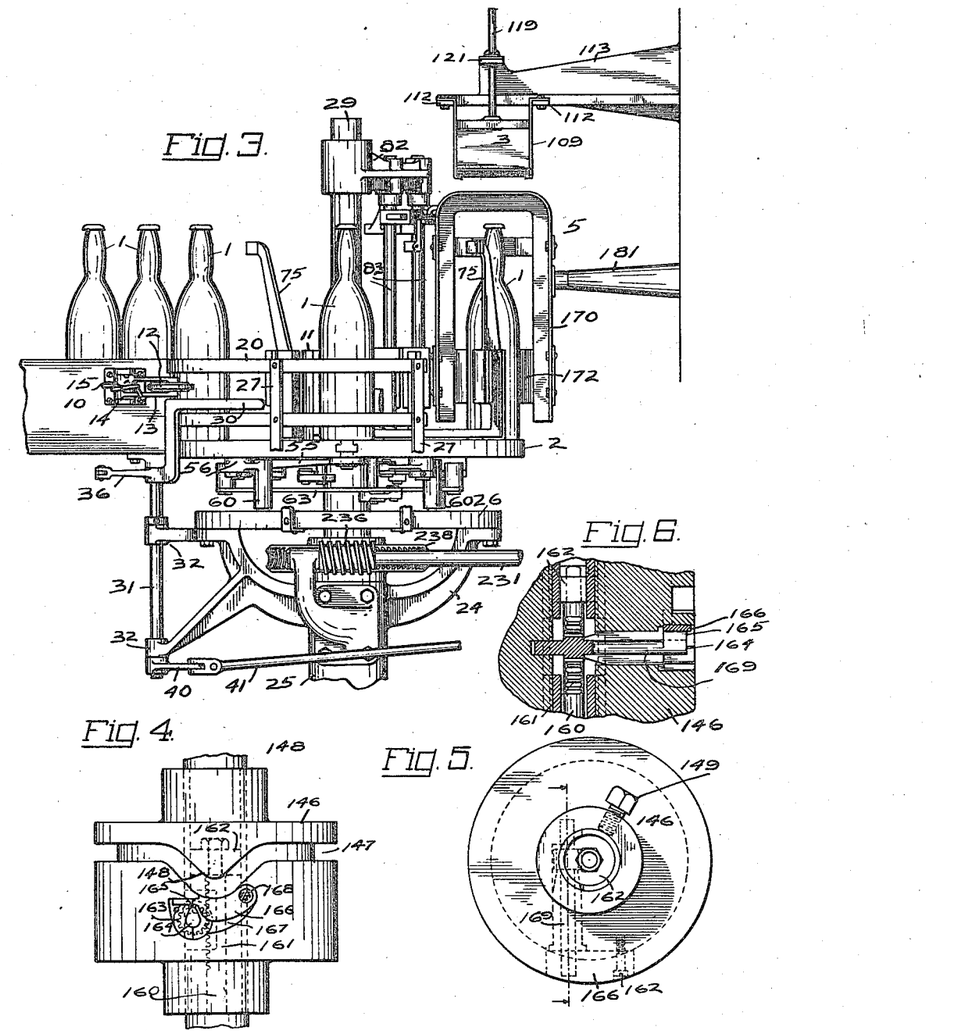
Fig. 3, illustrates a side view of the mechanism for controlling the bottles.
Figs. 4, 5, and 6, illustrate a cylindrical cam block and its selective controlling mechanism.
Figures 7, 10:
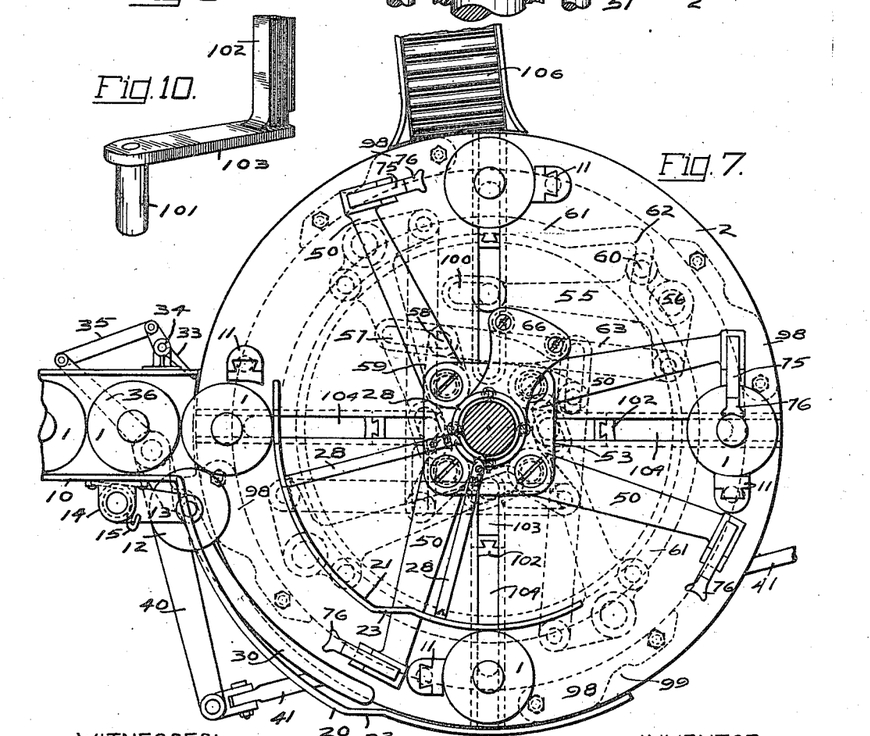
Fig. 7, illustrates mechanism for manipulating the bottles which coact to control parts of the labeling machine.
Fig. 10, illustrates the bottle ejector.
Figure 8:
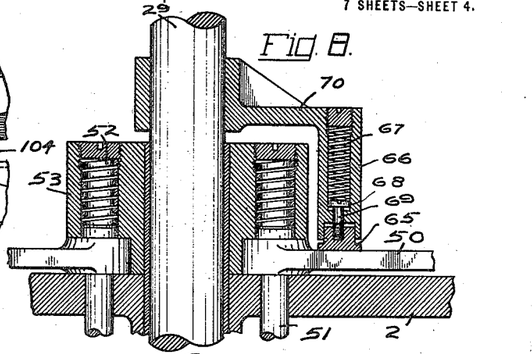
Figs. 8 and 9, illustrate details of construction of the means for holding the labels on the bottles.
Figure 9:
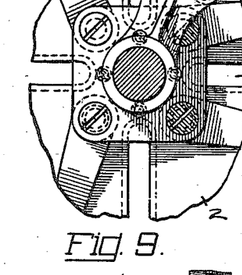
Figure 11:
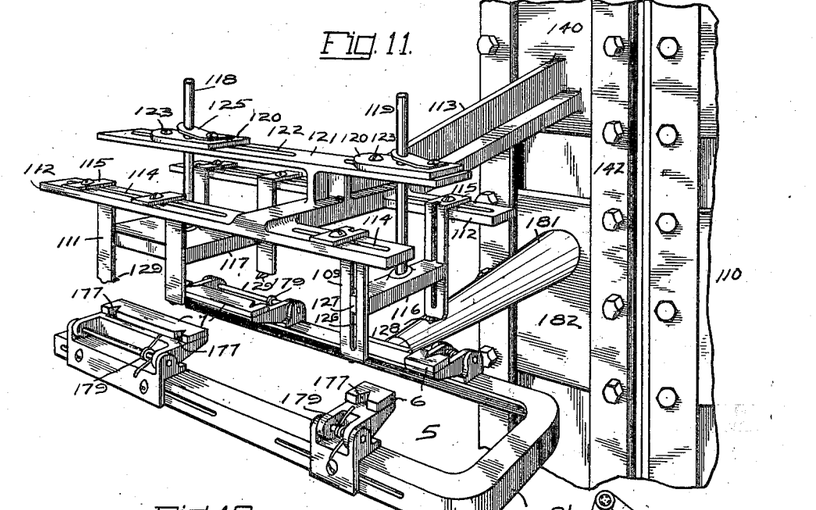
Fig. 11, illustrates the label rack or container and the label conveyer.
Figure 12:
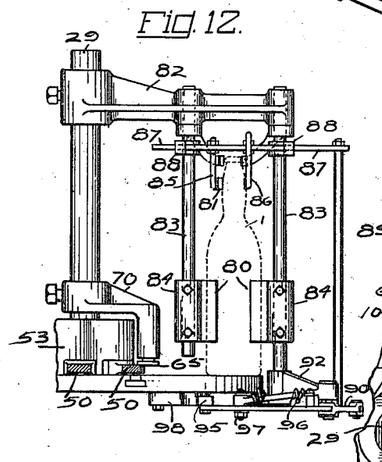
Figs. 12 and 13, illustrate side and top views of a label wiper for suitably wiping the labels after they have been placed in position on the bottles.
Figure 13:
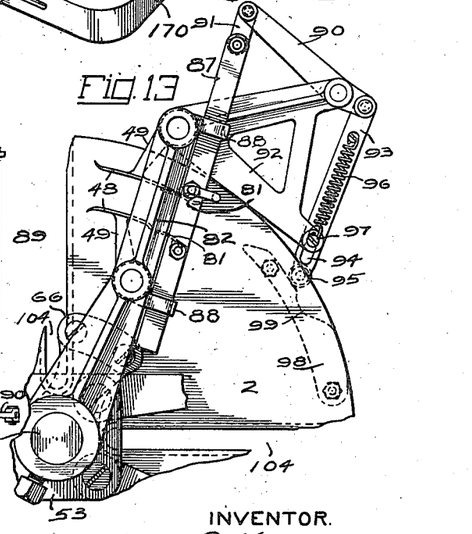
Figures 14, 15:
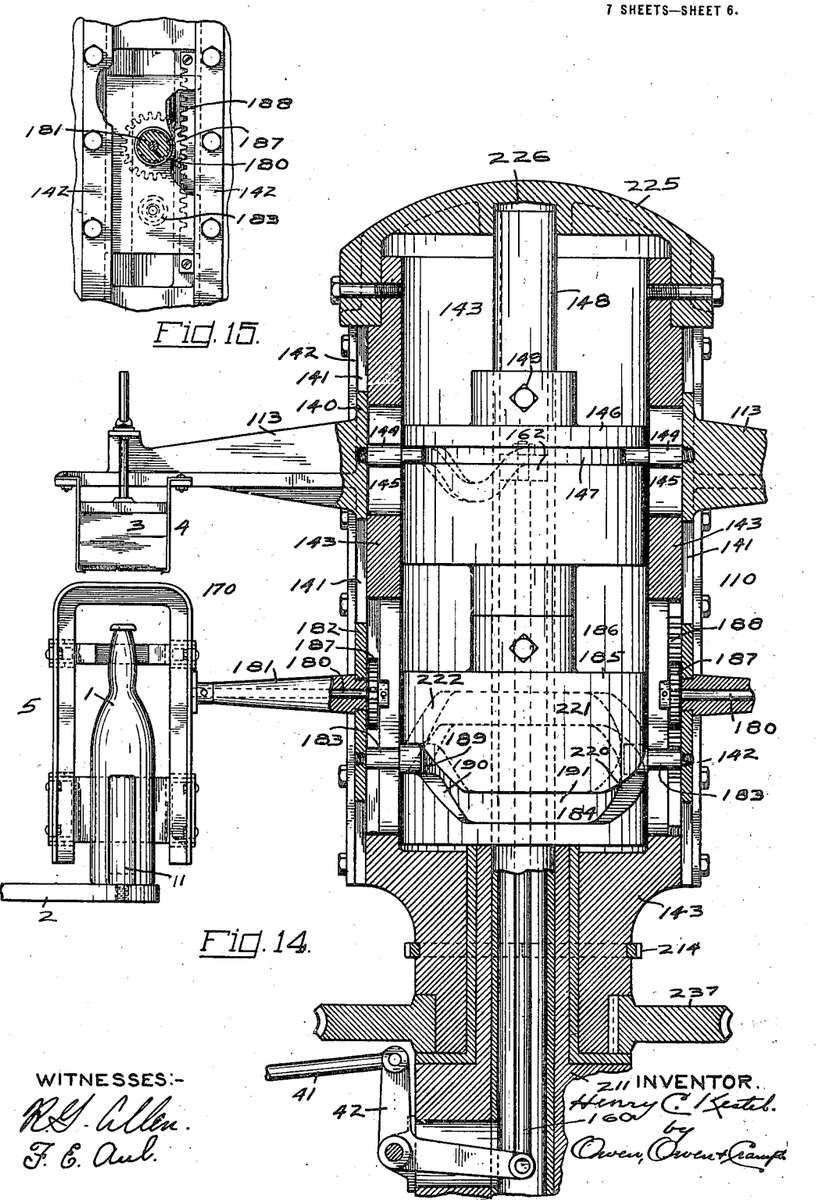
Fig. 14, illustrates a vertical axial section of the labeling turret having mechanism for manipulating the labels and applying them to the bottles.
Fig. 15, is an illustration of a rack for manipulating the label conveyer.
Figures 16, 17, 18:
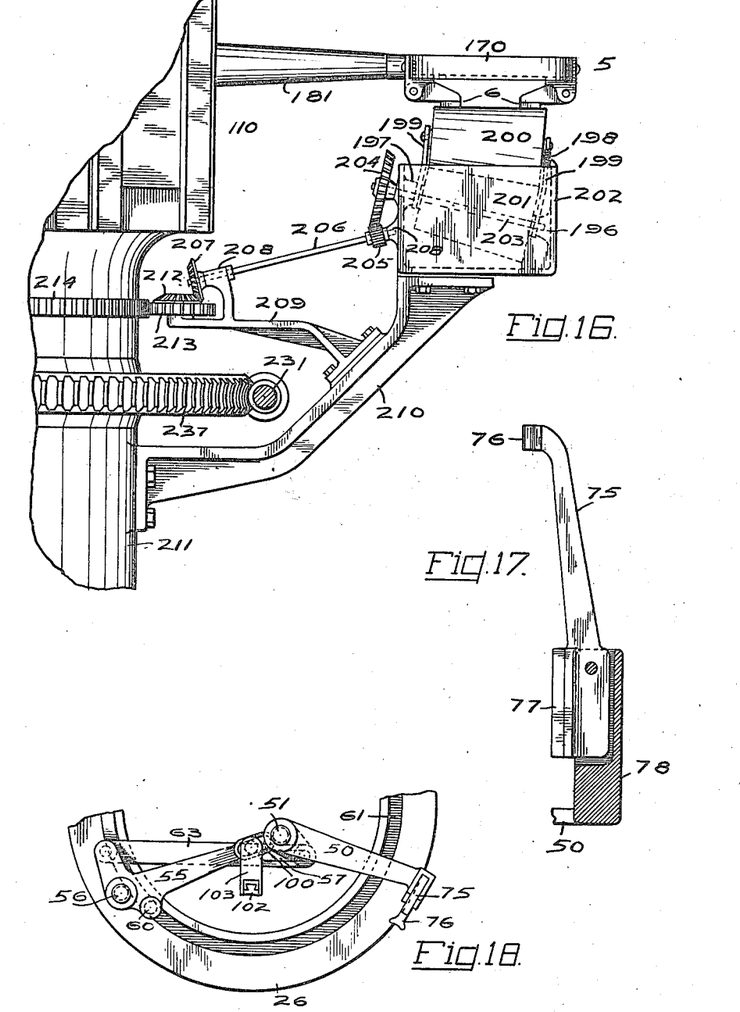
Fig. 16, illustrates the means for applying the agglutinating agent to the label.
Fig. 17, illustrates a finger having pads for holding the labels in position on the bottles during the application of the label.
Fig. 18, illustrates the links and levers for operating the label holders and ejectors.

The escapement finger or lever 33 prevents the escape of the bottles 1 from the trough 10 onto the plate 2 when bottles are forced against the lever 30. It prevents the bottle from passing onto the plate while the preceding bottle 1 is operating upon the lever 30 and thus prevents the engagement of the bottle passing onto the plate with the label holding arms 50 which are swung to a point in advance of the bottles as they are received on the plate, with a movement having a greater rate than that at which the plate 2 moves. Each arm 50 (see Fig. 8), is pivoted to the plate 2 by means of the pin 51 which is secured to arm 50, the pivoted end of the arm 50 frictionally engaging the surface of the plate 2. It is pressed against the plate 2 by means of the spring 52 which is located in the block or shell 53. The shell 53 is movable with the plate 2 about the fixed supporting shaft or spindle 29. The arms 50 are operated by the levers 55 which are pivoted by means of pins 56 to the plate 2. The levers 55 are connected to the slotted links 63 having the slots 57 in which are located pins 58, secured to the arms 59 which are connected to the arms 50 through the pins 51. The levers 55 are actuated by pins 60 which move in a channel 61 having a cam portion 62 located in the plate 26 as the plate 2 rotates. When the pins 60 reach the cam portion 62, the levers 55 are moved clockwise on the pivot pins 56 which force the links 63 to the left. This forces the pins 58 to the left and swings the arms 50 in advance of the bottles 1 as they are permitted to pass upon the plate 2 by the preceding bottle 1 pressing against the lever 30.

Each bottle is carried around on the plate 2 until the arm 50 preceding it passes beneath the spring pressed friction shoes 65, supported in the shell 66. A spring 67 presses against the head 68 of a screw 69 located in each shoe and extending through a bottom wall of the hole which contains the spring. The head of the screw operates also to limit the movement of the shoe 65 with respect to the shell 66. The arms 50 wipe underneath the shoes 65 which frictionally hold them until the bottles following reach them. The arms 50 are provided with fingers 75, having cushion pressure pads 76 and 77. The pad 76 presses against the label placed in line of movement of the neck of the bottle by the label conveyers 5, while the pad 77 presses against the label placed in line of movement of the body of the bottle by the conveyers 5 and operate to hold the labels while the bottles pass the wipers which wipe the ends of the labels. The fingers 75 are pivotally supported on posts 78 which are secured to or form a part of the ends of the arms 50.

The wipers 80 and 81 are adjustably supported on a bracket 82, which is supported on the spindle 29. The wipers 80 are connected to the bracket 82 by two depending rods 83, the wipers 80 are located in sleeves 84 which may be locked in any position along the rods 83, according to the position in which the labels are placed upon the bottles. The wipers 80 may be made of leather or rubber or any suitable material for drawing and wiping the side ends of the labels laterally and so as to press them against the bottle as the bottle passes between the wipers. The wipers 81 are supported on two depending rods 85 and 86 which are secured to a strip or rod 87 which extends horizontally and is supported in slotted members 88 which are adjustably secured to the rods 83. The rods 85 and 86 may also be adjustably secured to the horizontal rod 87. The rod 87 is connected to a vertical rod 89 which in turn is connected to a lever 90 through a link 91. The lever 90 is pivoted to a V-frame 92 which is fixedly secured to the lower end of the outer rod 83. The end of the lever 90 is connected to one end of a thrust rod 93. The opposite end of the thrust rod is provided with a slot 94 and a cam roller 95. A tension spring 96 is secured at one end to the thrust rod 93 and at the other end to a pin or bolt 97 located in the V-frame 92 and which passes through the slot 94. The spring 96 operates to draw the thrust rod 93 inwardly with respect to the central shaft or spindle 29 and draw the rod 87 outwardly. Cams 98 are secured to the underside of the plate 2 and so as to operate on the cam roller 95. The cams 98 are located behind their respective bottles and so as to cause the wipers to be actuated when each bottle passes between the wipers and beneath the bracket 82. As each bottle arrives in the vicinity of the wipers the roller 95 is forced outwardly by the cam 98 and as the cam roller 95 passes into the recess 99, the wipers are carried outward by the rod 87, so as to bring one edge of the label to the rear of the bottle and to wipe it behind the bottle and then as the roller 95 is forced outward by the cam 98, after the roller 95 passes the recess 99, the rod 87 is forced inward so as to cause the other wiper to bring the other edge of the label to the rear of the bottle and over the edge of the label which was first wiped to the rear of the bottle. Fingers 48 are supported on brackets 49 secured to the upper ends of the rods 83, and operate to prevent the bottles from being laterally tipped by the wipers when wiping the neck labels. The end of one arm of each lever 55 is provided with a slot 100, in which is located a pin 101, connected to the ejector 102 located one above and the other below the plane of the plate 2. The bars 103 which connect the two are located in slots 104 formed in the plate 2. The side walls of each slot may be channeled so as to guide the bar 103 back and forth in its movements in the plate 2. As each lever 55 is swung outwardly, the pin 101 moves in the slot 100 and pushes the ejector outwardly which pushes the bottle 1 off from the plate 2 upon a suitable conveyer 106, or into a suitable trough. As the pin 60 rides outwardly on the cam 62, the lever 55 also operates to push the arm 50 well in advance of the bottles over the plate 2 by means of the link 63. The link 63 operates upon the pin 58 located in the arm 59 which is connected to the arm 50. As a bottle passes the lever 30, the escapement finger 33 allows a bottle to pass upon the plate 2 behind the arm 50. The operation is thus continued as before.

The labels 3 are supported in racks 4 located on the turret 110 of the machine. Each rack contains two or more packs according to the number of labels to be placed on each bottle. Each label rack is provided with depending fingers 109 and 111 which are fastened to parallel horizontal rods 112. The rods 112 are secured to a bracket 113. The fingers 109 and 111 are provided with right-angular portions 115 which are bolted by bolts extending through the slot 114. The depending fingers 109 and 111 are thus adjustably located along the slot 114. Pressure plates 116 and 117 are located between the depending fingers 109 and 111. The rods 118 and 119 are secured to the pressure plates 116 and 117 and operate to guide the plates in their downward movement. The rods 118 and 119 move through plates 120 which are supported on a horizontal bar 121 located on the top of the bracket 113. The bar 121 is provided with slots 122 and bolts 123 which extend through the slots 122 and adjustably secure the rods relative to the adjustment of the depending fingers 109 and 111, along the slots 114. The plates 120 are provided with one-way escapement or lock springs 125 through which the rods 118 and 119 extend which permit a downward movement of the plates 116 and 117, but prevent a return movement of the plates 116 and 117. The depending fingers 109 are provided with slots 126 in which lugs or extensions 127 of the pressure plate 116 extend. The protruding portions 127 being located in the slots 126, operate to guide the pressure plate 116. The fingers 109 and 111 are provided with sharply turned points 128 and 129 which extend inwardly and hold the labels at or near the corners or ends. The labels are inserted underneath the plates 116 and 117 while the springs 125 are held down and the plates are pushed up. When the labels are placed in position the weighted plates 116 and 117 are returned and hold the labels against the points 128 and 129. The labels are removed one by one from beneath the pack of labels. As they are removed, the pressure plates 116 and 117 fall by their own weight keeping the lowermost labels always against the points 128 and 129.

The bracket 113 is connected to, or forms a part of the plate 140 which moves in side channels 141, formed by the strips 142 which are bolted to the body portion 143 of the turret 110. An inwardly extending pin 144 is secured to the plate 140 and moves in a slot 145 located in the body or shell 143 of the turret. A cylindrical cam 146 is located within the shell 143. The cylinder 146 is provided with a channel 147, having a cam portion 148 which extends downwardly from the plane of the major portion of the channel 147. The cylindrical cam 146 is held stationary while the turret 110 is rotated carrying with it the brackets 113 and the label racks 4 and the pins 144 are carried around in the channel 147. The label racks are carried downward as they pass the cam portion 148 of the block 146. This occurs before the racks are brought over the bottles on the plate 2, in advance of the application of the labels to the bottles. The block 146 is secured to a fixed spindle or sleeve 148 by means of a key bolt 149 and is adjustable on the said spindle or sleeve 148 so as to adjust the time of the drop of the racks.

The pins 144 reach the cam portion 149 of the channel 147 shortly after the bottles 1 have passed the lever 30, that is, shortly after the arm 40 and connecting rod 41 has operated the bell crank lever 42. The bell crank lever 42 is connected by a rod 160 to a rack 161 which extends upward through the sleeve 148. The rod 160 and rack 161 are guided in their vertical movements by the block 162 located within the sleeve 148 and to which the rod and rack are secured by a threaded nut. The rack 161 operates upon a pinion 163 which is connected to a cam 164 having a nose 165, by means of a rod or shaft 169. A pivoted cam block 166 is located in a niche or recess 167 formed in the cylindrical block 146 and in vicinity of the cam portion of the channel 147. The block 166 forms a portion of the underwall of the cam surface of the channel 147. When the pinion 163 is rotated by the rack 161, the cam block 166 is allowed to fall, the nose 165 being turned down, and turns on its pivot pin 168. When the pins 144 which operate to raise and lower the label racks enter the cam portion 148 and if a bottle is passing the lever arm 30 as it is carried by the bottle carrying plate 2, the rack 161 having allowed the cam block 166 to drop, permits the pins 144 to drop to the cam surface of the cam block 166, that is, lower than would occur if no bottle had previously passed the lever 30. This brings the label racks 4 lower down and in position to have a pair of its labels withdrawn therefrom, but if no bottle is in position to be labeled the racks will not be permitted to fall far enough to allow the removal of a set of labels from the racks.

The labels are picked from the racks by the conveyers 5 which are located beneath the racks. A conveyer or picker 5 coöperates with each rack in applying the labels to the bottles in succession. The conveyer 5 is provided with an angle U-bar 170 on which the paste pads 6 and 7 are mounted. The pads are made of suitable material such as rubber and are secured to yielding and cushioned plates or blocks 171 and 172. They are cushioned by means of cushions 173 located between the blocks 171 and 172 and the angle U-bar 170. The pads and their supporting blocks are hinged to the plates 174 and 175 which are adjustably secured in slots 176 located in the U-bar 170. They are yieldingly held in position by the springs 179. The pads are brought into contact with the lowermost labels in the rack 3. The pads 6 come in contact with the ends of the neck labels while the pads 7 come in contact with the side edges of the body labels. The pads 6 and 7 are provided with notches 177 which permit the pads to pass the points 128 and 129 located on the depending fingers 109 and 111 and so as to permit the surface of the pads to come in contact with the lowermost labels in the rack. When the pads are covered with an agglutinating agent and are thus brought in contact with the lowermost labels, the lowermost labels stick to the pads and then as the conveyer is withdrawn from the racks, the labels will extend across from the pads on one side of the U-bar 170 to the pads on the opposite side of the U-bar.

The U-bars 170 are secured to rods 180 rotatably mounted in sleeves 181 which are secured to plates 182. The plates 182 move in the side channels 141 and as the plates 182 are shifted vertically in the channels 141, they raise and lower the conveyers or pickers 5. The plates 182 are shifted vertically by means of pins 183 which are secured to the plates 182 and move in a channel 184 located in a cylindrical cam 185, having a plurality of inclined portions which give to the plates 182 varied movements and periods of rest as the turret 110 is rotated about the sleeve 148 to which the cylindrical block 185 is adjustably secured by means of the bolt 186. As the plates 182 are raised and lowered, the U-bars 170 are rotated from a horizontal position with the paste pads down, while they are being covered by an agglutinating material from the font 8 to a horizontal position beneath the labels with the glue pads turned up and again to a vertical position when the labels are applied to the bottles as the conveyers 5 pass over the bottle-carrying plate 2. The turning movements of the U-bar 17 are produced by the pinion 187 which is keyed to the rod 180 and the rack 188 which is located in the turret 110, over which the pinion 187 is moved by the shifting of the plate 182 by the operation of the pin 183 and the cylindrical block 185 having the channel 184 in which the pin 183 moves. When the pinion 187 is at an intermediate position along the rack 188, the U-bar 170 is in a vertical position and is located over the bottle-carrying plate 2. The pin 183 is then traveling along the portion 189 of the channel 184 and when the U-bar 170 has passed the wipers located above the bottle-carrying plate 2, the pin 183 is allowed to descend along the portion 190 of the channel 184 and in descending the U-bar 170 is turned through 90° to a horizontal position with the glue pads 6 and 7 turned down. The pin 183 then travels along the portion 191 of the channel 184. During this period in the cycle of operations of the conveyers 5 the pads pass over the glue font 8, the pads moving in contact with the cone platen 200. The line of contact of the cone 200 with the plane of the pads is horizontal and the cone-shape of the platen roller 200 gives a uniform coating of the agglutinating material to the pads, that is, the surface of the platen moves with the surface of the pads, though one is tangential to the other. The roller 200 is held in contact with a feed roller 201 located in a trough or receptacle 202. The cone roller 200 is supported between the arms 199 which are yieldingly held in position by a spring 198. The arms extend into the receptacle 202 and are pivoted on the rod 203 on each side of the roller 201. The shaft 203 is supported in bearings 196 and 197 located on the walls of the receptacle 202. The shaft 203 is keyed to a bevel gear 204, which is operated by the pinion 205 which is in turn keyed to the shaft 206, and that in turn is keyed to the bevel gear 207. The shaft 206 is supported in bearings 208, one located on the outside of one of the walls of the receptacle 202 and the other located in a bracket 209 which is supported on a bracket 210 which also supports the receptacle 202. The bracket 210 is connected to the supporting pedestal 211 which supports the turret 110. The bevel gear 207 is operated by a bevel gear 212 which is driven by a gear wheel 213 having a bearing in the bracket 209. The gear wheel 213 meshes with the gear 214 secured band-like on the turret 110. When the head or turret 110 is rotated the gear wheels 214, 213, 212, 207, 205 and 204, are rotated, which causes rotation of the feed rollers of the font.

The upper bearing 197 of the shaft 203 through which the shaft 203 extends to the exterior of the receptacle 202 is located above the level of the fluid agglutinant contained in the receptacle 203. This prevents any leakage of the agglutinant from the receptacle 202. A flexible elastic spreader 215 is located on the inner side of one of the walls of the receptacle 202 and below the line of contact between the rollers 200 and 201, which uniformly distributes the material over the roller 201 and prevents a superfluent supply of the agglutinant to the roller 200. This gives to the roller 200 a uniform quantity or spread of the agglutinant as it is delivered to the pads 6 and 7 of the conveyers or pickers 5.

When the pins 183 pass through the portion 191 of the channel 184 and the pads 6 and 7 have passed the roller 200, the pins 183 are raised and pass upwardly through the portion 220 of the channel 184. As the plates 182, together with the pinions 187, are raised, the racks 188 cause a reverse rotation of the U-bars 170, turning the U-bars over so as to bring the pads covered with the agglutinating material into the vicinity of the labels located in the label racks 4. Meantime, the pins 183 ride through the portion 220 of the channel 184 and pass into the portion 221. While the pin 183 is passing through the portion 221, the pin 144 of the rack above, passes into the cam portion 148 of the channel 147 located in the cylindrical cam 146 which allows the corresponding plate 140 and rack 4 to drop to the bottom of the cam portion 148 of the channel 147 and, if a bottle has passed the lever arm 30, to cause the operation of the arm 40, connecting rod 41, bell crank lever 42, rack 161, pinion 163 and cam 164, to allow the cam block 166 to drop to the bottom of the recess 167, the label rack 4 will drop so as to bring the lowermost labels into contact with the paste pads 6 and 7. The paste pads 6 will come into contact with the ends of the neck labels located between the depending fingers 109, while the pads 7 will come into contact with the side edges of the body labels located between the depending fingers 111. The lowermost labels will stick to the pads 6 and 7 and as the pin 144 rides up on the cam block 166 and into the horizontal portion of the channel 147, the label rack will be lifted from the paste pads 6 and 7, leaving the lowermost labels on the paste pads. Meantime, the pin 183 passes through the portion 221 of the channel 184 in the cylindrical block 185 and descends in the portion 222 of the channel 184. As the pin 183 is allowed to descend, the rack 188 and pinion 187 cause reverse rotation of the U-bar 170 carrying with it the labels taken from the label rack 4. As the pins 183 ride in the portion 189 of the channel 184, the U-bar 170 passes over the plate 2. The bottle carried by the plate passes between the paste pads 6 and 7. As the paste pads pass the bottle, the bottle, if large enough, brushes the blocks 172 which yieldingly move about their pintles and, at the same time, the labels are drawn from the pads and the lower labels may be drawn around the body of the bottle sufficient to bring the portions of the labels which have received paste from the pads into contact with the surface of the bottle so as to hold the labels in position on the bottles until the bottle passes between the wipers, whereupon the edges of the labels are wiped by movement of the bottle-carrying plate as it carries the bottle between the wipers. Immediately after the labels are brought into contact with the surface of the bottles by the conveyers or pickers 5 and as the bottles are passing through the conveyers the arms 50 pass beneath the feet 65 and frictionally engage therewith to hold the arms 50 notwithstanding the friction caused by the springs 52, until bottles and labels are brought into contact with the cushioned pads 76 and 77. The pads 76 and 77 operate to hold the labels in position while the labels are being drawn from the paste pads 6 and 7 and while they are being operated upon by the wipers 80 and 81. The bottles are then carried around and delivered to the conveyer 106.

Meantime, the pin 183, is carried into the portion 190 of the channel 184 and the plate 182, together with a conveyer 5, is allowed to fall and, at the same time, the U-bar is rotated so as to bring the pads into the plane of contact of the paste roller. The cycle of operations of the conveyer thus continues.

The top of the shell 143 is closed by a cap 225 having a central hole 226 within which the sleeve 148 is located when the cap is placed in position. It forms a guiding bearing at the upper end of the turret 110.

The mechanism is driven by the pulley wheel 230 which is keyed to the shaft 231. The shaft 231 is supported on the pedestal 211 and by a bracket 233 and also on the pedestal 25 by the bracket 234. Worm gears 235 and 236 are keyed to the shaft 231 and operate upon the worm gear wheels 237 and 238. The diameter of the gear wheel 237, is twice the diameter of the gear wheel 238, so that the turret 110 rotates one-half as fast as the plate 2, but there are twice as many racks on the turret as there are bottles placed on the bottle-carrying plate, measured angularly.

The pedestals 25 and 211 are supported on a suitable base and the pulley wheel 230 is driven by a suitable source of power such as an electric motor.

The construction selected and described, may be greatly varied in the arrangement and manufacture of its parts and in the substitution of elements having equivalent functions and such modifications may be used for many varied purposes and still contain the invention.

What I claim as new, and desire to secure by Letters Patent, is as follows:

1. The combination of a receptacle conveyer, a label container located above the path of movement of the receptacles, a label picker located below the label container and means for rotating the label picker and the label holder above the path of movement of the receptacles and means for shifting the label picker to convey the labels from the container to the receptacles.

2. The combination of a label container, a label conveyer having paste pads, a paste font, a receptacle holder, means for rotating the label conveyer, means for independently rotating and shifting the label conveyer from the paste font to the label container and to the receptacle, a label wiper and a label holder for holding the labels when applied to the receptacles.

3. The combination of a plurality of label containers, a plurality of label conveyers, means for rotating the containers and the conveyers, a paste font, a receptacle holder and means for inverting the conveyers in their movements from the containers to the paste font and to the receptacles.

4. The combination of a bottle conveyer, label containers having a plurality of sets of labels, a label conveyer for conveying the labels in sets, means for rotating the containers and label conveyers about a common axis, a paste font, a label holder for holding sets of labels, means for conveying the conveyer from the paste font to the containers and to the receptacles and means for applying the label holder after the labels have been conveyed to the bottles.

5. The combination of a receptacle conveyer, a label conveyer, a label holder, means for returning the holder to the receptacle when the labels have been applied by the label conveyer, a receptacle ejector, and means for operating the ejector and shifting the label holders to in advance of the receptacles as the receptacles are received on the conveyer.

6. The combination of a receptacle conveyer, a label conveyer, a label holder, means for shifting the label holder to in advance of the receptacles as they are received on the receptacle conveyer, an escapement and means for operating the escapement so as to permit the receptacles to pass upon the receptacle container after the label holder has passed to in advance of the receptacles.

7. The combination of a label container and a label conveyer, a receptacle conveyer, a label holder, means for shifting the label holder to in advance of the receptacles as they are received on the label conveyer, an escapement for preventing the receptacles passing onto the conveyers until the label holder has passed to in advance of the receptacles, means for controlling the label conveyer in its receipt of labels from the container and means operated by the receptacles for actuating the escapement and the controlling means.

8. The combination of a receptacle conveyer, a label holder operated on the receptacle conveyer and frictionally engaging therewith, means for shifting the label holder to in advance of the receptacles, a means for holding the label holder until the receptacles are brought into engagement therewith by the receptacle conveyer.

9. The combination of a fixed cam plate, a rotatable receptacle conveyer, a receptacle ejector, a label holder, the said ejector and the said label holder operated by the said cam plate.

10. The combination of a label container, a cylindrical cam for shifting the container, a cam block located in the cylindrical cam and means controlled by the receptacle for shifting the cam block for extending the shifting movement of the label container.

11. The combination of a rotatable receptacle conveyer, a plurality of label containers and a plurality of label conveyers, a paste font, a turret for supporting the containers and the conveyers, means for rotating the receptacle conveyer and the turret and cams for shifting the containers and the conveyers to bring the conveyers into contact with the paste font and the containers and to convey the labels to the receptacles.

12. The combination of a rotatable receptacle conveyer, a plurality of label containers and a plurality of label conveyers, a paste font, a turret for supporting the containers and the label conveyers, means for rotating the receptacle conveyer and the turret and cams for shifting the containers and the label conveyers to bring the label conveyers into contact with the paste font and the containers and to convey the labels to the receptacles and means for rotating the conveyers when shifted.

13. The combination of a label container, a label conveyer, a paste font, a cylindrical cam for shifting the label conveyer, means for rotating the label conveyer as it is shifted by the cylindrical cam to the paste font and to the label container and to the receptacle.

14. The combination of a receptacle holder, a label container, a label conveyer located below the label container, means for rotating the label container and the label conveyer, a paste font, a cylindrical cam for shifting the conveyer, means for rotating the conveyer about an axis at right angles to the rotation of the label container as it is shifted by the cylindrical cam, a paste font, the cylindrical cam having a surface for holding the conveyer in a plane at right angles to the axis of rotation of the container when the conveyer moves over the paste font and a surface for shifting the conveyer to the container and a surface for holding the conveyer inverted beneath the container and a surface for shifting the conveyer to an intermediate plane as it passes the receptacle and a surface for shifting the conveyer to the plane of the paste font.

15. The combination of a label container, a label conveyer located below the label container, means for rotating the label container and the label conveyer, a paste font, a cylindrical cam for shifting the conveyer, means for rotating the conveyer about an axis at right angles to the rotation of the label container as it is shifted by the cylindrical cam, a paste font, the cylindrical cam having a surface for holding the conveyer in a plane at right angles to the axis of rotation of the container when the conveyer moves over the paste font and a surface for shifting the conveyer to the container and a surface for holding the conveyer inverted beneath the container and a surface for shifting the conveyer to an intermediate plane as it passes the receptacle and a surface for shifting the conveyer to the plane of the paste font and a cylindrical cam for shifting the container to the conveyer while the conveyer is held inverted to convey a label to the conveyer.

16. The combination of a rotatable receptacle conveyer, means for receiving the receptacles of the conveyer in spaced relation, label holders supported centrally with respect to the receptacle conveyer, a yielding engaging means for engaging the label holders in succession to return them relatively to the receptacles, means for conveying labels to the receptacles and a fixed cam adapted to operate upon the label holders in succession by the rotation of the label conveyer to advance the label holders to in front of the receptacles as they are received on the receptacle conveyer.

17. The combination of a means for holding receptacles, a label container, a label conveyer having a U-shaped member and having paste pads located on the legs of the U-member, means for rotating the U-member from the paste font to the label container and then to cause the legs of the U-member to pass on the opposite sides of the receptacles.

18. The combination of a receptacle conveyer, a label container, a paste font having a conical feed roller, a U-shaped label conveyer having a U-member, and having paste pads on the legs of the U-member, means for rotating the label container and the U-member about a common axis and means for rotating the U-member from a horizontal position while passing the paste font to a horizontal inverted position while in contact with the labels of the containers and to a vertical position while applying the labels to the receptacles.

19. The combination of a receptacle conveyer, a plurality of label containers, a plurality of U-shaped label conveyers having paste pads on the legs of the U-member, a label conveyer located beneath each label container, means for rotating the label containers and the label conveyers about a common axis, a paste font, means for rotating and shifting the U-member from a horizontal position while the paste pads are passing over the paste font to an inverted horizontal position while the paste pads are in contact with the labels in the label container and to a vertical position while legs of the U-member pass opposite sides of the receptacles.

20. The combination of a receptacle conveyer, means for permitting the receptacles to pass upon the receptacle conveyer in spaced relation, a plurality of label containers, a plurality of U-shaped label conveyers having hinged adjustable paste pads located on the legs of the U-members, a paste font having a cone-feed roller, means for rotating and shifting the label conveyers from a horizontal position as the paste pads pass over the paste font to an inverted horizontal position to bring the paste pads in contact with the labels of the label container, and to a vertical position over the receptacle conveyer as the receptacles pass between the paste pads.

21. The combination of a receptacle conveyer, means for directing the receptacles upon the receptacle conveyer, a plurality of shiftable label containers, a plurality of label conveyers having paste pads, a paste font, means for rotating and shifting the label conveyers from a horizontal position as the paste pads pass over the paste font to a horizontal inverted position to bring the paste pads in contact with the labels of the label container and to a vertical position over the receptacle conveyer, and means for preventing the label conveyer from shifting to come in contact with the labels when a receptacle position on the conveyer is vacant.

22. The combination of a plurality of label containers, a plurality of label conveyers, means for rotating the containers and conveyers, a paste font, a receptacle holder and means for inverting the conveyers in their movements from the containers to the paste font and to the receptacles, the conveyers passing over the paste font when in a semi-inverted position.

23. The combination of a means for holding receptacles, a label container, a label conveyer having a label holding member, paste pads located on the sides of the member for engaging the ends of the labels, means for rotating the member from the paste font to the label container and then to convey the paste pads to opposite sides of the receptacles and the labels across the receptacles.

24. The combination of a receptacle conveyer rotatable about a vertical axis, a plurality of label containers and a plurality of label conveyers, means for rotating the label containers and label conveyers about a common axis and in the same direction that the receptacle conveyer is rotated and so as to pass the receptacles in a direction opposite to that in which the receptacles are moved, a paste font, means for shifting the label conveyers relative to the label containers, to pass over the paste font and to convey the labels from the label container to the receptacles.

In testimony whereof, I have hereunto signed my name to this specification in the presence of two subscribing witnesses.

HENRY C. KESTEL.

Witnesses:
F. E. AUL,
M. H. MAYERS.